United States Patent
Gheen et al.

[15] 3,642,306
[45] Feb. 15, 1972

[54] CANTED SEAL IRRIGATION COUPLING

[72] Inventors: Lyndle G. Gheen; Paul J. Daniels, both of Eugene, Oreg.

[73] Assignee: R.H. Pierce Manufacturing Company, Eugene, Oreg.

[22] Filed: May 4, 1970

[21] Appl. No.: 34,089

[52] U.S. Cl..................................................285/5, 285/111
[51] Int. Cl.............................................................B05b 15/00
[58] Field of Search.....................285/5, 6, 231, DIG. 4, 340, 285/DIG. 11, 111, DIG. 19, 223, 230, 232, 233, 234, 369, 355; 277/207 A

[56] References Cited

UNITED STATES PATENTS

| | | |
|---|---|---|
| 3,366,403 | 1/1968 | Nelson.............................................285/6 |
| 3,362,729 | 1/1968 | Hendriks...........................285/340 X |
| 2,341,670 | 2/1944 | Stinson..............................285/355 X |
| 2,746,772 | 5/1956 | Race et al..................................185/5 |
| 2,085,922 | 7/1937 | Moore..............................285/369 X |
| 3,386,755 | 6/1968 | Miller.........................................285/6 |

*Primary Examiner*—Dave W. Arola
*Attorney*—Buckhorn, Blore, Klarquist and Sparkman

[57] ABSTRACT

A coupling body and a flexible seal permit a tube to be pivoted 12° upwardly from alignment to provide clearance for latching pawls, and also permit 6° movement of the tube downwardly and to each side horizontally. A clamping band has an inwardly formed biting lip to grip the tube and a lap joint is provided between an apron and the body.

12 Claims, 7 Drawing Figures

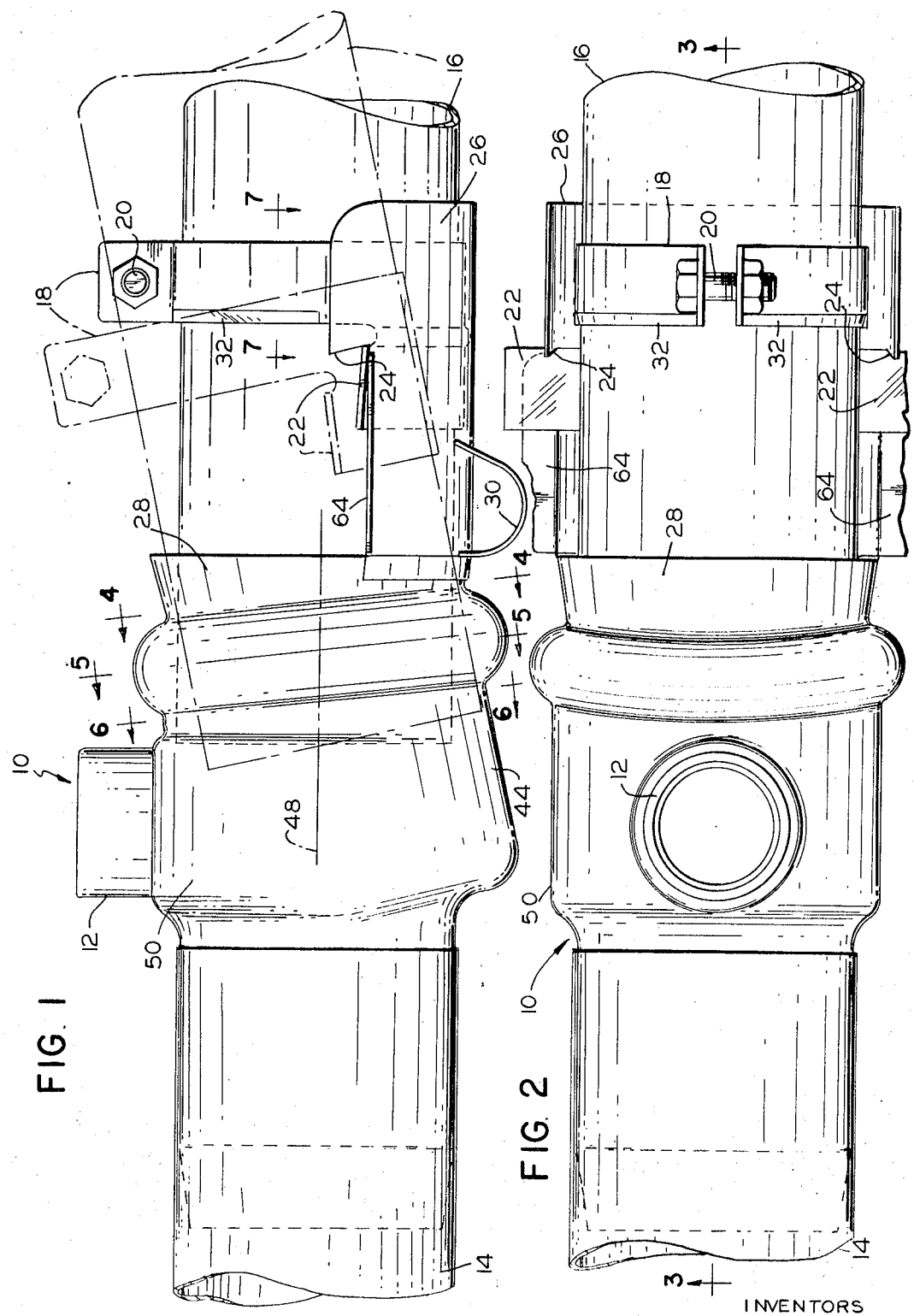

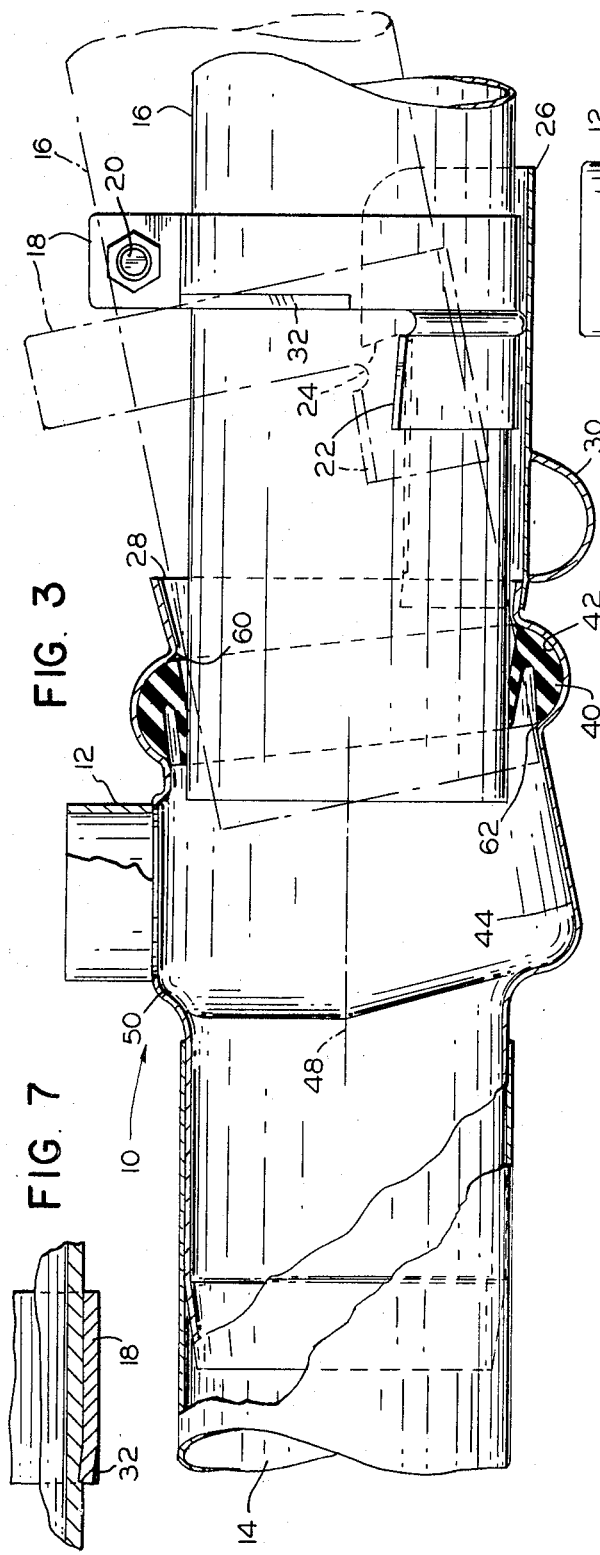
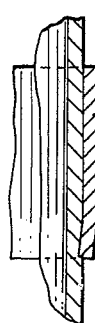
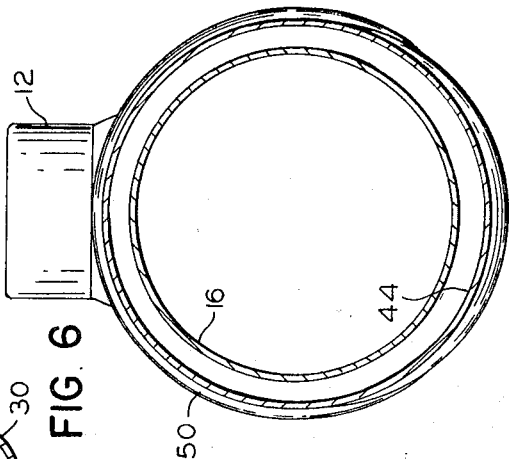
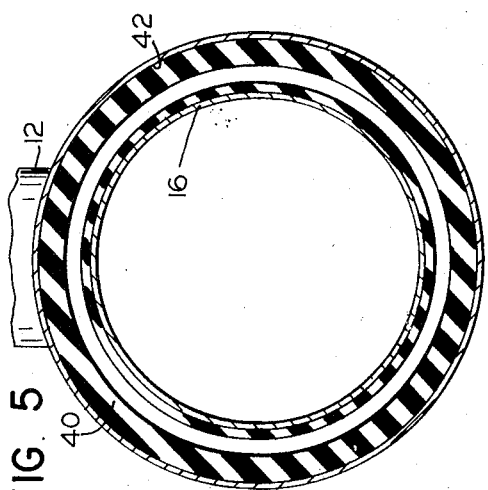
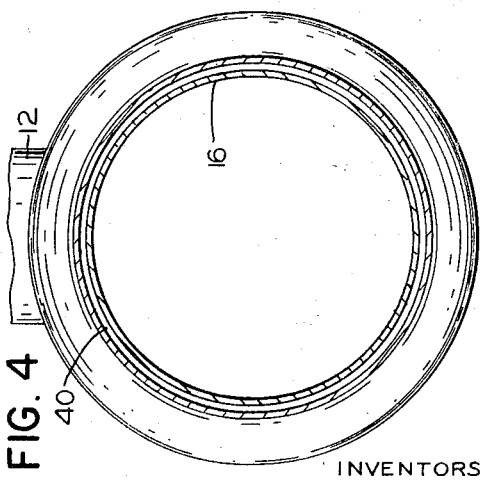
INVENTORS
LYNDLE G. GHEEN
PAUL J. DANIELS
BY
BUCKHORN, BLORE, KLARQUIST & SPARKMAN
ATTORNEYS

CANTED SEAL IRRIGATION COUPLING

This invention relates to a canted seal irrigation coupling, and more particularly to an improved pivotal, quick detachable coupling.

An object of the invention is to provide a canted seal irrigation coupling.

Another object of the invention is to provide an improved pivotal, quick detachable coupling.

A further object of the invention is to provide an irrigation coupling having a flexible seal inclined to the normal to the longitudinal axis of a coupler body to permit a wide swing of a tube to clear locking structure of a band on the tube and an apron fixed to the body.

Another object of the invention is to provide a locking band having a biting portion.

Another object of the invention is to provide a coupling structure including a body and an apron secured together by a lap joint.

The invention provides a canted seal irrigation coupling including a body, a tube having an end portion fitting pivotally into the body, latching structure and a canted seal permitting pivotal movement of the tube relative to the body.

In the drawings:

FIG. 1 is a side elevation view of a canted seal irrigation coupling forming one embodiment of the invention;

FIG. 2 is a top plan view of the coupling of FIG. 1;

FIG. 3 is a fragmentary vertical sectional view taken along line 3—3 of FIG. 2;

FIGS. 4, 5 and 6 are generally vertical, somewhat canted, sectional views taken respectively along lines 4—4, 5—5 and 6—6 of FIG. 1; and FIG. 7 is an enlarged, fragmentary, horizontal sectional view taken along line 7—7 of FIG. 1.

Referring now in detail to the drawings, there is shown therein a canted seal irrigation coupling forming one embodiment of the invention and including a body 10 having a riser socket 12 and to one end of which a tube 14 is swaged. The body 10 is adapted to sealingly receive for limited pivotal movement in the other end thereof an end portion of a second tube 16. A split locking band 18 is clamped to the tube 16 by bolt 20 and has downwardly canted locking pawls 22 engaging overhanging shoulders 24 of an apron 26 lap joint welded to a frustoconical tapered lip portion 28 of the body 10. A base 30 is welded to the apron 26. The upper portions of the arms of the band 18 have inwardly formed, biting end portions 32 serving to dig into the tube 16 to lock the band 18 securely to the tube 16 and prevent cocking and sliding of the band relative to the tube 16.

A chevron-type seal 40 fits in a groove 42 in the body canted or inclined to the vertical and sealingly engaging the wall of the groove and the end portion of the tube 16. The groove is inclined sufficiently to permit sufficient relative pivotal movement vertically between the tube 16 and the body 10 for the pawls 22 to clear the shoulders 24 for insertion of the tube 16 into the body and for withdrawal of the tube 16 from the body. A belled or tapered lower clearance portion 44 of the body provides clearance for the end portion of the tube 16 when the tube 16 is swung upwardly relative to the body for insertion and withdrawal. The flexible seal 40, the belled portion 44 and the upper portion of the lip portion 28 of the body are so positioned as to permit the tube 16 to be pivoted upwardly 12° relative to normally horizontal axis 48 of the body. The belled portion 44 blends into lessly belled side and top belled portions 50 which permit the tube 16 to be pivoted 6° downwardly or 6° to either side relative to the body, the flexible seal 40 and the tapered lip portion 28 also providing clearance for such movement.

The body 10, the apron 26 and the band 18 preferably are of sheet steel and the body formed by hydroforming. However, the body and the apron may be of cast metal also.

As best illustrated in FIG. 3, the uppermost point of rounded, beadlike juncture 60 of the tapered portion 28 and the groove 42 is substantially higher than the upper periphery of the tube 16 when the tube 16 is in its normal position aligned with the longitudinal axis of the body 10, and the lowest point of the juncture 60 is lower than the lower periphery of the tube 16 and the sides of the juncture 60 are similarly spaced outwardly from the tube 16 when the tube 16 is in its normal position. These spacings permit free vertical pivotal movement of 18° (12° up and 6° down) of the tube 16 relative to the body and free horizontal pivotal movement of 12° (6° to each side). Rounded juncture 62 between the groove 42 and the body is spaced even farther from the tube, as shown in FIGS. 3 and 6, to provide clearance for such pivotal movements. Ledges 64 limit downward pivotal movement of the tube and the shoulders 24 tend to somewhat resist upward pivotal movement of the tube along with the resistance of the seal 40.

What is claimed is:

1. In combination,
   a first tube,
   a second tube,
   a generally horizontal coupler body coupled to the first tube,
   the coupler body having an end portion for receiving the end portion of the second tube and permitting limited pivotal movement to a predetermined extend of the second tube downwardly and to each side and permitting pivotal movement of the second tube upwardly to a greater extent than said predetermined extent,
   a flexible sealing ring engaging the exterior of the second tube and the interior of the body and permitting such pivotal movement of the second tube,
   the sealing ring being canted to a predetermined extent relative to the vertical to a position in which its longitudinal axis is inclined to the horizontal in a direction such as to be more nearly centered relative to the second tube when the second tube is pivoted upwardly to its extreme than if the sealing ring were horizontal,
   means holding the ring in said position in the body,
   and latch means preventing withdrawal of the second tube from the coupler body except when the second tube is pivoted upwardly beyond said predetermined extent.

2. The combination of claim 1 wherein the body has an internal annular groove receiving the sealing ring and so canted relative to the vertical as to retain the sealing ring in said position of the sealing ring.

3. The combination of claim 2 wherein the body includes a tapered entrance portion extending from the groove.

4. The combination of claim 3 including an apron overlapping the entrance portion and welded thereto.

5. The combination of claim 2 including an apron welded to the body.

6. The combination of claim 5 wherein the latch means includes pawl means secured to the second tube and interlocking stop means on the apron.

7. The combination of claim 5 wherein the latch means includes a pair of locking pawls secured to the second tube and notchlike retaining portions on the apron for receiving the pawls.

8. The combination of claim 5 wherein the latch means comprises a split band clamped to the second tube and having pawl means,
   the apron including latch means adapted to interlock with the pawl means.

9. The combination of claim 8 wherein the latching band includes biting means dug into the second tube.

10. The combination of claim 9 wherein the biting means comprises lips formed by bending edge portions of the band radially inwardly.

11. In an irrigation coupling body,
    a first generally cylindrical tubular end portion,
    a second tubular end portion generally aligned with the first tubular end portion and having an internal annular groove canted to a predetermined extent from the normal to the longitudinal axis of the second end portion for holding a seal, and a central portion joining the end portions and having a clearance portion the second tubular end portion having a tapered entrance end portion canted to substantially said extent relative to the central portion.

12. The irrigation coupling body of claim 11 including an apron portion welded to the tapered entrance portion and overlapping the tapered entrance portion.

* * * * *